United States Patent [19]

Fischer

[11] 4,131,144
[45] Dec. 26, 1978

[54] TREE SHEAR ASSEMBLY WITH TOGGLE LINKAGE

[75] Inventor: Robert L. Fischer, New Lenox, Ill.

[73] Assignee: Caterpillar Tractor Co., Peoria, Ill.

[21] Appl. No.: 745,741

[22] Filed: Nov. 29, 1976

[51] Int. Cl.² ............................................. A01G 23/08
[52] U.S. Cl. ................................. 144/34 E; 144/3 D
[58] Field of Search ............... 83/928, 589, 590, 600, 83/646, 698, 694; 144/2 Z, 3 D, 34 R, 34 E, 309 AC; 30/228, 181, 251

[56] References Cited

U.S. PATENT DOCUMENTS

| 944,555 | 12/1909 | Holden | 144/34 E |
|---|---|---|---|
| 2,366,909 | 1/1945 | Johnson | 30/228 |
| 2,930,122 | 3/1960 | Pfundt | 30/228 |
| 3,039,189 | 6/1962 | McBenty | 30/228 X |
| 3,488,797 | 1/1970 | Dirks | 30/228 X |
| 3,915,211 | 10/1975 | Barwise | 144/34 E |
| 3,927,704 | 12/1975 | Wirt | 144/34 E |
| 3,946,776 | 3/1976 | Oldenburg et al. | 144/34 E |
| 3,986,542 | 10/1976 | Guy et al. | 144/34 E |
| 3,995,671 | 12/1976 | Wirt | 144/34 E |

Primary Examiner—J. M. Meister
Assistant Examiner—W. D. Bray
Attorney, Agent, or Firm—Phillips, Moore, Weissenberger, Lempio & Strabala

[57] ABSTRACT

A tree shear assembly includes first and second blades pivotally connected to each other, and a toggle link system operatively connected with the first and second blades and in cooperative association with an extendible and retractable cylinder for closing and opening the blades.

6 Claims, 5 Drawing Figures

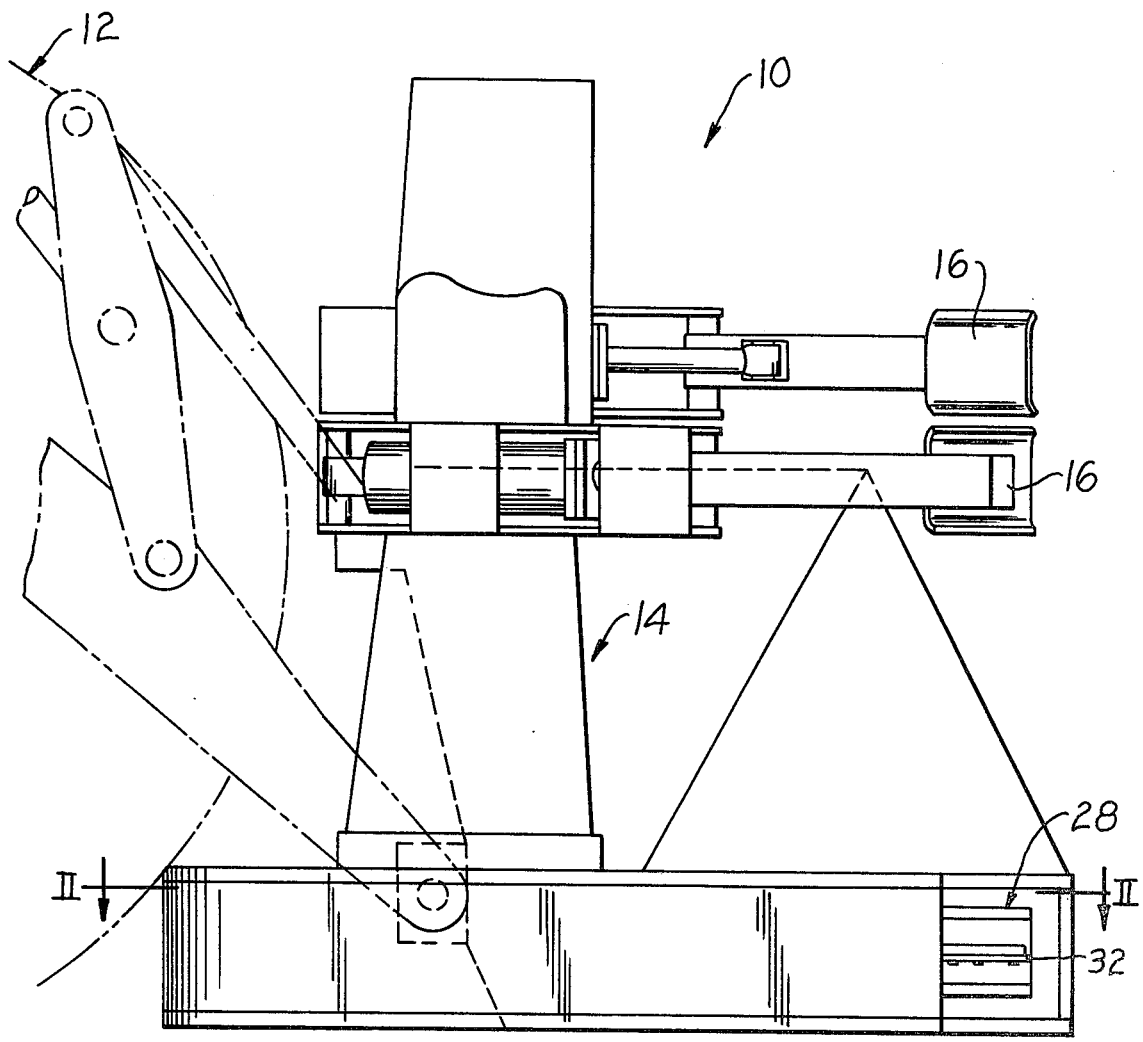
Fig_1_

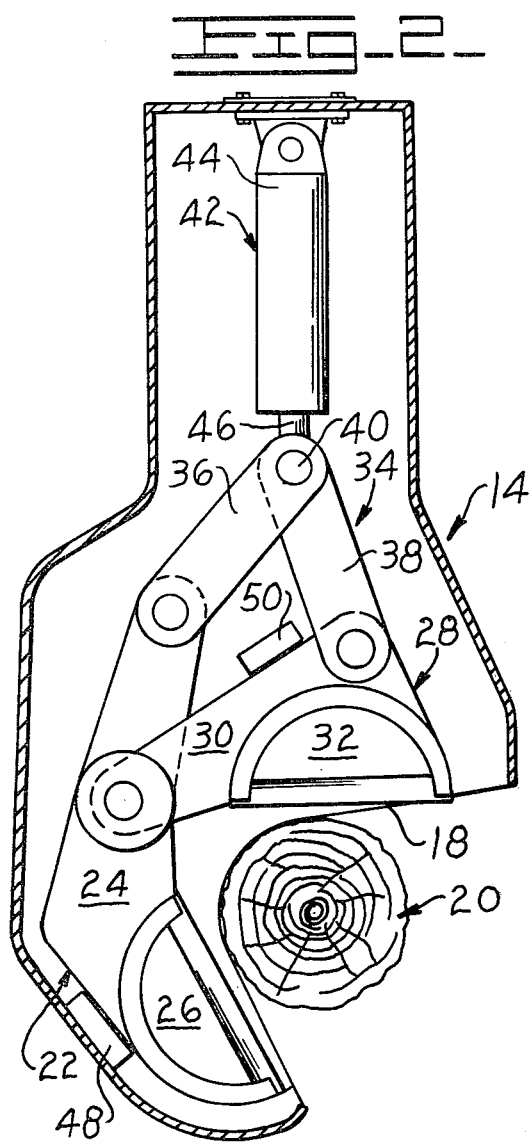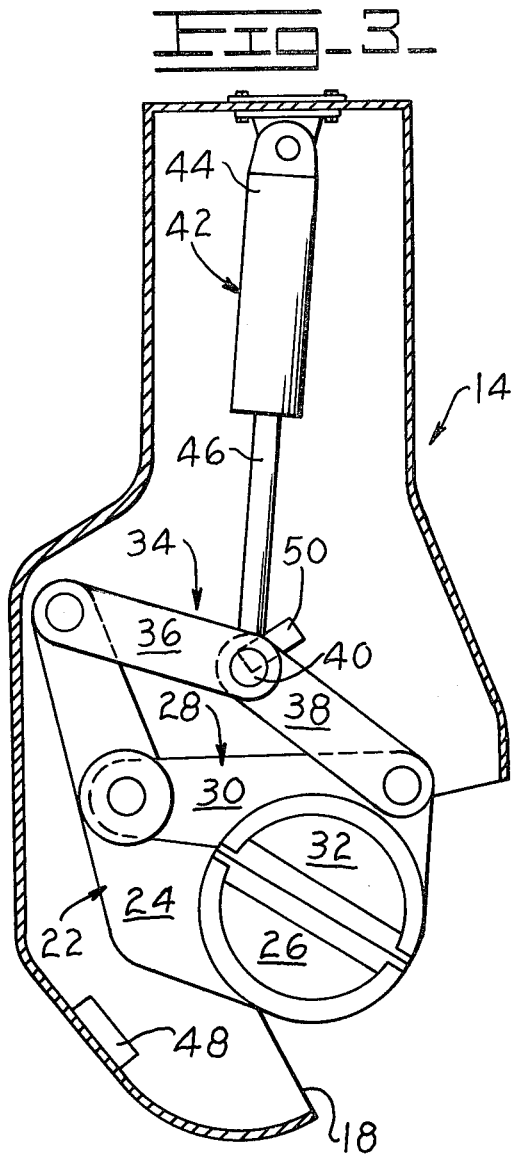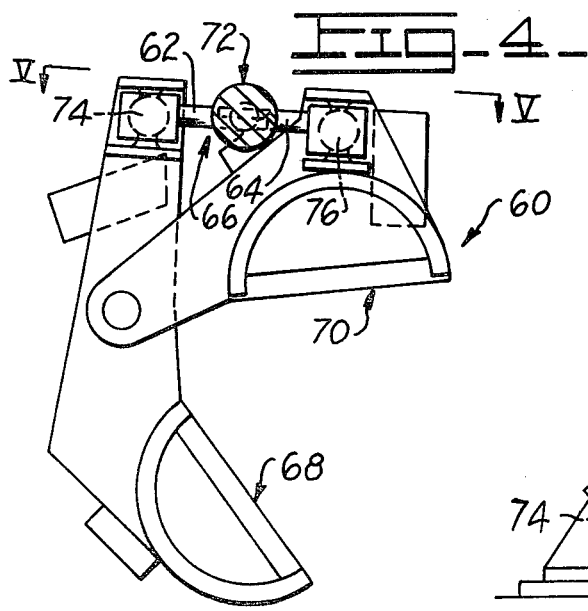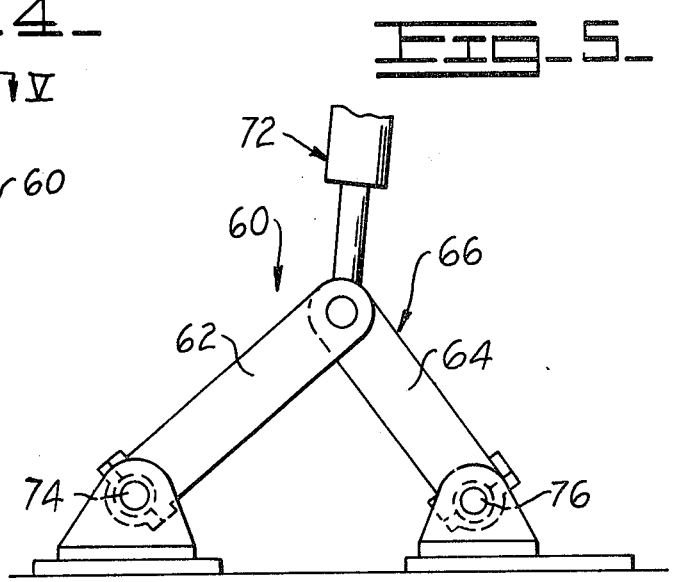

TREE SHEAR ASSEMBLY WITH TOGGLE LINKAGE

BACKGROUND OF THE INVENTION

This invention relates to tree-shearing apparatus, and more particularly, to a tree-shearing apparatus incorporating a toggle linkage for actuation and control of movement thereof.

In the shearing of the body of a tree by a two-blade shear assembly, it is important that the forces on the cutting blades be substantially equalized during the cutting operation thereof. The equalization of such forces aids in producing an even, smooth and efficient cut. Furthermore, it will be realized that the blades should operate in a manner which will tend to minimize damage to the body of the tree. The assembly with advantage should also be compact in design, so as to provide efficient use of space of the vehicle on which it is mounted.

Of general interest in this area are U.S. Pat. No. 3,270,787, disclosing a tree-shearing apparatus incorporating a single blade for cutting of the body of a tree. Of further interest in this area is U.S. Pat. No. 3,720,246, which includes a single cylinder interconnecting a pair of links, and extendible and retractable to pivot a pair of cutting blades.

SUMMARY OF THE INVENTION

It is accordingly an object of this invention to provide tree-shearing apparatus which includes two blades which are activated through an appropriate linkage to provide equalization of shearing force between the blades.

It is a further object of this invention to provide a tree-shearing apparatus which, while fulfilling the above object, tends to minimize damage to the body of the tree being sheared.

It is a still further object of this invention to provide a tree-shearing assembly which, while fulfilling the above objects, is extremely compact in design and efficient in use.

Broadly stated, the invention comprises tree-shearing apparatus comprising first blade means, and second blade means pivotally connected relative to the first blade means. A first link is included, and a second link is pivotally connected relative to the first link. The first and second links are pivotally connected relative to the first and second blade means respectively. Means are included for applying force to the first and second links, the first and second links being positioned so that application of force to the first and second links applies force to the first and second blade means to provide shearing of the body of a tree disposed therebetween.

BRIEF DESCRIPTION OF THE DRAWINGS

These and other objects of this invention will become apparent from a study of the following specification and drawings, in which:

FIG. 1 is a side elevation of a first embodiment of tree-shearing apparatus;

FIG. 2 is a sectional view taken along the line II—II of FIG. 1, with the blades in the open position;

FIG. 3 is a view similar to that shown in FIG. 2, but with the blades in the closed position;

FIG. 4 is a view similar to that shown in FIG. 2, but of a second embodiment of the invention; and FIG. 5 is a view taken along the line V—V of FIG. 4.

DESCRIPTION OF THE PREFERRED EMBODIMENT

Shown in FIG. 1 is a first embodiment of tree-shearing apparatus 10 mounted to the front portion of a vehicle 12 as is well known. The apparatus 10 includes a frame portion 14 having grapple arms 16 mounted thereto for gripping the sheared body of a tree. The frame portion 14 includes a generally U-shaped portion 18 within which the body of a tree 20 may be positioned, by appropriate positioning of the vehicle 12, and by spreading apart of the blade means of the apparatus 10, as will be described in detail.

As shown in FIGS. 2 and 3, the apparatus 10 includes first blade means 22 including a body 24 having a blade 26 mounted thereto. Also included are second blade means 28 having a body 30 pivotally connected to the body 24 of the first blade means 22, and having a blade 32 fixed thereto. A toggle link assembly is shown at 34. Such toggle link assembly 34 includes first and second pivotally connected links 36,38. The ends of the links 36,38 extending from the pivotal connection 40 are pivotally connected in turn to the respective bodies 24,30 of the blade means 22,28. A cylinder 42 has its head end 44 pivotally connected to the frame portion 14, and has its rod end 46 pivotally connected to the pivotal connection 40 of the links 36,38. The cylinder 42 is disposed generally in the plane in which the blade means 22,28 move, and the links 36,38 are movable generally in the plane in which the blade means 22,28 move.

With the cylinder 42 in its retracted position, it will be seen that the pivotal connection 40 of the links 36,38 is moved to an upward position (FIGS. 2 and 3), decreasing the angle between the links 36,38 to in turn pivot the blade means 22,28 and blades 26,32 thereof relatively apart. Pivoting of such blade means 22,28 apart is limited by bringing such blade means 22,28 into contact with respective blocks 48,50 secured to the frame portion 14. With the cylinder 42 in such retracted state, it will be seen that the frame portion 14 may be positioned so that the body of the tree 20 may appropriately seat within the generally U-shaped portion 18 of the frame portion 14.

With the frame portion 14 so appropriately positioned, the grapple arms 16 may be actuated to grip the body of the tree 20 as is well known.

When shearing of the body of the tree 20 is desired, the cylinder 42 is extended, tending to increase the angle between the links 36,38 as shown (FIG. 3), in turn tending to pivot the blade means 22,28 to bring the blades 26,32 into contact with the body of the tree 20, whereupon further extension of the cylinder 42 provides that the blades 26,32 cut through the body of the tree 20. The toggle link assembly 34 made up of links 36,38, and their appropriate positioning, provides that highly effective cutting of the body of the tree 20 takes place, with substantial equalization of cutting forces between the blades 26,32, and with minimal damage to the body of the tree 20.

Shown in FIGS. 4 and 5 is a second embodiment of the apparatus 60. As shown therein, the links 62,64 making up the toggle assembly 66 are disposed generally in a plane perpendicular to the plane in which the blade means 68,70 move, and the cylinder 72 is disposed generally in the plane perpendicular to the plane in which the blade means 68,70 move. Thus, in the previously described embodiment, the blade means 22,28, links 36,38 and cylinder 42 lie generally in a horizontal plane, while in the second embodiment, the blade means 68,70 are movable in a generally horizontal plane, with the links 62,64 and cylinder 72 disposed generally in a vertical plane. In such embodiment of FIGS. 4 and 5, the links 62,64 are pivotally connected relative to the blade means 68,70 by respective ball joints 74,76, allowing for changing of relative positioning of the links 62,64 and blade means 68,70 during pivoting of the blade means 68,70. The embodiment of FIGS. 4 and 5, it will be seen, is extremely compact, not requiring a large horizontal frame, since the cylinder 72 extends in a generally vertical direction. Also such cylinder 72 is well removed from the ground, so as to be removed from dirt and foreign objects which might possibly interfere with the operation thereof.

I claim:

1. Tree shearing apparatus comprising:
   first blade means having a first blade movable between an open and a closed position for engaging and cutting one side of the body of a tree;
   second blade means pivotally connected to the first blade means having a second blade operatively positioned in an opposed relationship to said first blade and moveable between an open position and a closed position for engaging and cutting another side of the body of a tree such that said blades are positioned substantially oppositely when in their respective closed positions;
   a first link means;
   a second link means pivotally connected to the first link means;
   the first and second link means being pivotally connected to the first and second blade means, respectively, said second blade means being pivotally connected to said first blade means at a point between said first blade and the point whereat said first link means is pivotally connected to said first blade means;
   means connected to the first and second link means for applying force to the first and second link means, the first and second link means being positioned and connected to the first and second blade means so that application of force to the first and second link means applies force to the first and second blade means simultaneously to move said first and second blades from said open to said closed position to provide shearing of the body of a tree disposed therebetween.

2. The apparatus of claim 1 and further comprising frame means, and wherein the force-applying means comprise cylinder means pivotally connected to the frame means and pivotally connected to the pivotal connection between the first and second link means.

3. The apparatus of claim 2 wherein the cylinder means is disposed at least generally in a plane in which the first and second blade means move.

4. The apparatus of claim 3 wherein the first and second link means are movable at least generally in a plane in which the first and second blade means move.

5. The apparatus of claim 2 wherein the cylinder means is disposed at least generally in a plane perpendicular to a plane in which the first and second blade means move.

6. The apparatus of claim 5 wherein the first and second link means are disposed at least generally in a plane perpendicular to a plane in which the first and second blade means move.

* * * * *